US011321267B2

(12) United States Patent
Jeansonne et al.

(10) Patent No.: US 11,321,267 B2
(45) Date of Patent: May 3, 2022

(54) SAFE PERIPHERAL DEVICE COMMUNICATIONS

(71) Applicant: HEWLETT-PACKARD DEVELOPMENT COMPANY, L.P., Houston, TX (US)

(72) Inventors: Jeffrey K. Jeansonne, Houston, TX (US); Justin C. Prindle, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 660 days.

(21) Appl. No.: 16/074,180

(22) PCT Filed: Sep. 30, 2016

(86) PCT No.: PCT/US2016/054901
§ 371 (c)(1),
(2) Date: Jul. 31, 2018

(87) PCT Pub. No.: WO2018/063368
PCT Pub. Date: Apr. 5, 2018

(65) Prior Publication Data
US 2021/0133140 A1  May 6, 2021

(51) Int. Cl.
*G06F 13/20* (2006.01)
*G06F 13/42* (2006.01)

(52) U.S. Cl.
CPC ...... *G06F 13/4221* (2013.01); *G06F 13/4282* (2013.01); *G06F 2213/0024* (2013.01); *G06F 2213/0042* (2013.01)

(58) Field of Classification Search
CPC .................................................. G06F 13/4221
See application file for complete search history.

(56) References Cited

U.S. PATENT DOCUMENTS

| 4,942,606 A * | 7/1990 | Kaiser | G06F 21/85 |
| | | | 340/5.74 |
| 6,799,255 B1 * | 9/2004 | Blumenau | G06F 3/0622 |
| | | | 711/112 |

(Continued)

FOREIGN PATENT DOCUMENTS

| CN | 1128368 | 8/1996 |
| CN | 84995783 | 9/2015 |

(Continued)

OTHER PUBLICATIONS

"Safely Disable Firewire/thunderbolt, Patching up DMA Exposure", Retrieved from Internet: https://security.stackexchange.com/questions/17051/safely-disable-firewire-thunderbolt-patching-up-dma-exposure, Aug. 28, 2012, 2 pages.

(Continued)

*Primary Examiner* — Henry Tsai
*Assistant Examiner* — Dean Phan
(74) *Attorney, Agent, or Firm* — Brooks, Cameron & Huebsch PLLC

(57) ABSTRACT

Example implementations relate to safe peripheral device communications. In one example, a host computing device can include a serializer/deserializer (SERDES), a PCIe bus, a video source, a connector coupled, via the SERDES, to the PCIe bus and the video source; and a host controller to operate in a safe mode and cause PCIe data from PCIe bus to be provided, via the SERDES and the connector, solely to a peripheral controller of a peripheral device.

11 Claims, 4 Drawing Sheets

(56) References Cited

U.S. PATENT DOCUMENTS

| | | | |
|---|---|---|---|
| 8,638,838 B1* | 1/2014 | Betts | H04L 25/0294 375/219 |
| 9,081,909 B2 | 7/2015 | Chu et al. | |
| 2005/0273312 A1* | 12/2005 | Sandulescu | G06F 3/023 703/25 |
| 2008/0172501 A1 | 7/2008 | Goodart et al. | |
| 2009/0003361 A1 | 1/2009 | Bakthavathsalam | |
| 2011/0087806 A1* | 4/2011 | Mohanty | G06F 13/385 710/16 |
| 2011/0296236 A1* | 12/2011 | Kawamoto | G06F 11/0793 714/6.21 |
| 2014/0126613 A1* | 5/2014 | Zhang | H04L 7/033 375/219 |
| 2016/0062911 A1 | 3/2016 | Kegel et al. | |

FOREIGN PATENT DOCUMENTS

| | | |
|---|---|---|
| CN | 105830024 | 8/2016 |
| CN | 106201934 | 12/2016 |
| EP | 2733619 A1 | 5/2014 |
| GN | 104951419 A | 9/2015 |
| TW | 201207624 A | 2/2012 |
| TW | 201435646 A | 9/2014 |
| TW | 201512839 A | 4/2015 |
| WO | 2010014321 A2 | 2/2010 |

OTHER PUBLICATIONS

Markuze et al., "True IOMMU Protection from DMA Attacks: When Copy is Faster than Zero Copy", Retrieved from Internet: https://www.cs.tau.ac.il/~mad/publications/asplos2016-iommu.pdf, 2015, pp. 249-262.

"Preventing DMA Attacks", Retrieved from Internet: https://security.stackexchange.com/questions/88629/preventing-dma-attacks, May 6, 2015, 2 pages.

Yao et al., "A Tour beyond BIOS Using Intel VT-d for DMA Protection in IEFI BIOS", Retrieved from Internet: https://firmware.intel.com/sites/default/files/resources/A_Tour_Beyond_BIOS_Using_Intel_VT-d_for_DMA_Protection.pdf, Jan. 2015, 25 pages.

Thunderbolt (Interface), Wikipedia, Dec. 18, 2019.

* cited by examiner

SAFE PERIPHERAL DEVICE COMMUNICATIONS

BACKGROUND

Computing system may include multiple input/output (I/O) systems. The systems can be a wired I/O such as Ethernet, Universal serial bus (USB), esata, IEEE 1394, thunderbolt, or another system. Such wired I/O systems can permit a physical connection to exchange data and/or power between a peripheral device and a computing system.

DETAILED DESCRIPTION

Figure 1:
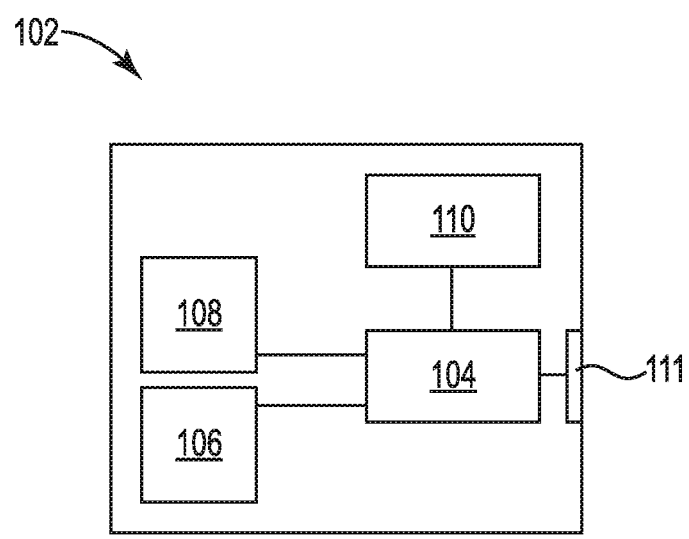
FIG. 1 illustrates a diagram of an example of a host computing device for safe peripheral device communications according to the disclosure.

A connector may be included in a host computing device to couple the host computing device in a wired or wireless manner to a peripheral device. For example, in wired input/output (I/O) systems wired connectors can permit a physical connection to exchange data and/or power between a wired connector of a peripheral device such as a docking station and a corresponding wired connector of a host computing system such as a laptop. That is, coupling the host computer to the peripheral device may permit communication between the host computer and the peripheral device. For example, when a host device is coupled to a peripheral device the peripheral device (and in some instances additional peripheral devices 'daisy chained' to the peripheral devices) can receive data such as PCIe data via a communication path between the host device and the peripheral device coupled to the host device.

However, the communication path between the peripheral device and the host device may be exploited by a nefarious peripheral device. For example, a nefarious peripheral device may be able to perform a direct memory attack (DMA) or other type of attack on a computing device by leveraging such a communication path to gain unintended access to the host computing device. For instance, the nefarious peripheral device may gain access (e.g., read/write access) to a memory of the host computing device by passing through a PCIe bus of the host computing device to memory of the host computing device. While some mechanisms such as prompting a user of a computing device to enable a peripheral device connection, such approaches may not and/or may not sufficiently protect the computing device from attacks such as DMA attacks.

Accordingly, the disclosure is directed to safe peripheral device communications. In various examples, safe peripheral device communications can employ a host computing device including a serializer/deserializer (SERDES), a PCIe bus, a video source, a connector coupled, via the SERDES, to the PCIe bus and the video source; and a host controller to operate in a safe mode and cause PCIe data from PCIe bus to be provided, via the SERDES and the connector, solely to a peripheral controller of a peripheral device.

As used herein, PCIe data refers to data provided via a PCIe bus. As used herein, PCIe data provided "solely" between to a peripheral controller of a peripheral device refers to providing the PCIe data exclusively to the peripheral controller and not to other portions (other than the PCIe data path passing through a SERDES of the peripheral device) nor providing the PCIe data outside of the peripheral device. "Solely" providing the data to the peripheral controller is in contrast to other approaches that may pass the PCIe data to other portions of a peripheral device (e.g., to a second SERDES) and/or pass the PCIe data outside of the peripheral device such as to other peripheral device coupled to the peripheral device and therefore be subject to attacks such as DMA attacks. It is understood the peripheral controller can the host computing device can operate in full duplex (having send and receive capabilities) when PCIe data is communicated 'solely' between (i.e., to and/or from) the host computing device and the peripheral computing device, as described herein.

As used herein, safe peripheral device communications can occur when the host device is operating in a 'safe mode' either as a default mode of operation, in response to a system condition (e.g., such as coupling of the host computing device to a peripheral device) and/or when selected such as selection of 'safe mode' by an end user of the host computing device. Desirably, safe peripheral device communications can provide a peripheral device such as a docking station with PCIe data while blocking the possibility of various attacks such as DMA attacks by providing the PCIe data data solely to a peripheral controller of the peripheral device. As mentioned, the PCIe data is not passed to other portions of the peripheral device and/or outside of the peripheral device itself. As a result, the host computing device is thereby inherently blocks attacks such as DMA attacks from nefarious peripheral devices coupled to the host computer operating in safe mode.

Notably, the peripheral device can communicate various other types of non-PCIe data such as display port data and/or USB data (which may be derived internally within the peripheral device controller from PCIe data) to other portions of the peripheral device and/or outside of the peripheral device, for instance, to other peripheral devices coupled to the peripheral device. By so doing, the peripheral device (and other peripheral devices coupled to the peripheral device) can desirably maintain various functions such as display functions even when coupled to a host computing device operating in safe mode, FIG. 1 illustrates a diagram of an example of a host computing device 102 for safe peripheral device communications according to the disclosure. As illustrated in FIG. 1, the host computing device 102 can include a SERDES 104, a PCIe bus 106, a video source 108, a host controller 110, and a connector 111. While the FIG. 1 illustrates the SERDES 104, the PCIe bus 106, the video source 108, the host controller 110, and the connector 111 as separate and distinct components it is understood that such components and/or other components may be combined. For instance, while FIG. 1 illustrates the SERDES 104 as separate and distinct from the host controller 110 in some embodiments the SERDES 104 can be included in (within a physical footprint) of the host controller 110.

The host computing device 102 can be a mobile phone, payment instrument, tablet, desktop computer, and/or laptop computer, among other types of computing devices including a connector to couple (in a wired or wireless manner) to and communicate data (e.g., peripheral component interconnect express (PCIe) data) with a peripheral device.

The SERDES 104 can perform serialization and/or deserialization of instructions and/or data to provide data transmission over a limited input/output interface. For example, the SERDES can receive and translate (e.g., serialize/deserialize) data into a different format. The SERDES 104 can receive data such as display port data from the video source 108 and/or PCIe data from the PCIe bus 106 and translate the data in a serial communication using a Parallel In Serial Out (PISO) hardware to receive and translate the data, among other possibilities.

The serial communication can be sent, via the connector 111, to a peripheral device, as described herein. The SERDES 104 can be coupled to the connector 111, the host controller 110, the PCIe bus, and the video source 108, as illustrated in FIG. 1. Sending the transmission in a serial manner between the host device 102 and a peripheral device can provide improved data transmission rates reduce the number of signals required for the interface, and/or improved security as opposed to sending the data in another non-serial manner.

The PCIe bus 106 can be a serial expansion interface circuit (bus) that may provide improvements over, for example, PCI, PCI-X, and AGP (Accelerated Graphics Port) bus standards, among others. While FIG. 1, illustrates the computing device 102 as including the PCIe bus 106 the disclosure is not so limited. Rather the host computing device 102 can include alternate or additional interfaces such a serial advanced technology attachment (SATA), SATA express, peripheral component interconnect (PCI), and/or a universal serial bus (USB), among other connectors and interfaces.

The video source 108 refers to component capable of generating a video signal such as those employed with Display Port (DP), VGA, and/or Component Video. In some examples, the video source 108 can be a DP interfaces. The video source 108 can provide DP data to the SERDES 104, alone or with other video, audio, USB, or other type of data. In various examples, the video source 108 can provide video data such as DP data, via the SERDES 104 and/or the connector 111 to a peripheral device capable of displaying the video data.

The host controller 110 refers to a hardware logic device (e.g., a logic die, application-specific integrated circuit (ASIC) that can execute instructions to perform various aspects of safe peripheral device communications. The host controller 110 can include hardware components and/or computer-readable and executable instructions to cause the host computing device 102 to operate in safe mode (as a default mode of operation and/or in response to a selection provided to the host computing device 102) and/or can cause PCIe data from the PCIe bus 106 to be provided, via the SERDES 104 and the connector 111, solely to a peripheral controller of a peripheral device, among other possibilities.

The instructions (e.g., software, firmware, programming, etc.) may be stored in a memory resource (e.g., computer-readable medium) or as a hard-wired program (e.g., logic). For example, the host controller 110 can include a number of engines can include a combination of hardware and instructions to perform a number of functions described herein (e.g., cause PCIe data from PCIe bus to be provided, via the SERDES and the connector, solely to a peripheral controller of a peripheral device, etc.).

Each of the engines can include hardware or a combination of hardware and instructions. The controller 110 can be implemented on a host computing device, as illustrated in FIG. 1, and/or a collection of host computing devices, on a peripheral device and/or on a collection of peripheral devices, and/or on a combination of a host computing device and a peripheral device.

The connector 111 refers to a wired and/or wireless connector. For instance, in some examples the connector can be a wired connector such as Ethernet, Universal serial bus (USB), esata, IEEE 1394, thunderbolt, or another system. In examples the connector 110 can be a USB connector, among other possibilities. It is noted the host device (and similarly the peripheral device described herein) can include any suitable number of connectors.

In some examples, the connector 111 can be a type-C USB port. A type-C USB port can operate in a plurality of modes including a USB mode, a DP mode (e.g., with shared USB or other type of data and DP) and/or or a mode that can carry serialized PCI-e interleaved with Display Port data. As mentioned, in various examples, the connector 111 can be coupled, via the SERDES 104, to the PCIe bus 106 and the video source 108 such that the host controller 110 can a host controller to operate in a safe mode and cause PCIe data from PCIe bus 106 to be provided, via the SERDES and the connector 111, solely to a peripheral controller of a peripheral device.

For instance, the host computing device 102 can include a chassis. The chassis can include the connector 111. For example, the chassis can include a side having the connector 111 mounted on and/or within the chassis on a side of the host computing device 102, among other possibilities.

Figure 2:
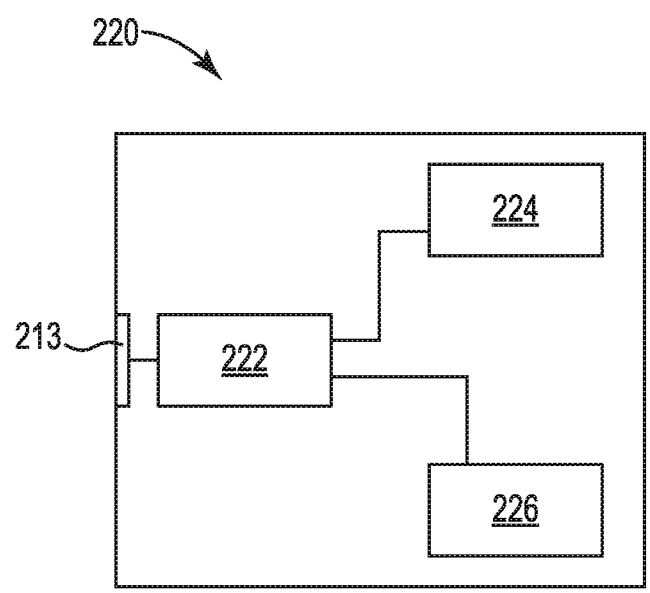
FIG. 2 illustrates a diagram of an example of a peripheral device for safe peripheral device communications according to the disclosure.

FIG. 2 illustrates a diagram of an example of a peripheral device 220 for safe peripheral device communications according to the disclosure. As illustrated in FIG. 2, the peripheral device 220 can include a corresponding connector 213, SERDES 222, a peripheral controller 224, a second SERDES 226.

While the FIG. 2 illustrates the corresponding connector 213, the SERDES 222, the peripheral controller 224, and the second SERDES 226 as separate and distinct components it is understood that such components and/or other components may be combined. For instance, while FIG. 2 illustrates the SERDES 222 and the second SERDES 226 as separate and distinct from the peripheral controller 224 in some embodiments the SERDES 222 and/or the second SERDES 226 can be included in (within a physical footprint) of the peripheral controller 224. For instance, each of the SERDES 222 and the second SERDES 226 can be included within the peripheral controller 224 to promote aspects of safe peripheral communications such as providing the PCIe data solely to the peripheral controller 224. In some examples, each of the SERDES 222 and the second SERDES 226 can be included within a chip (e.g., a silicon based chip) comprising the peripheral controller 224, However, the disclosures not so limited. For instance, in some examples the SERDES 222, but not the second SERDES 226 can be included with a chip comprising the peripheral controller 224, among other possibilities.

The peripheral device 220 can be a displays (e.g., monitors, televisions, etc.) mobile devices, docking stations, desktop computers, and/or laptop computers, among other types of electronic devices that include a corresponding connector to couple to a connector in a host commuting device and communicate data (e.g., PCIe data) with the host computing device. In some examples, the peripheral device 220 can be a docking station. For instance, the peripheral device 220 can be a docking station to couple to and dock a host computing device physically with the docking station.

The corresponding connector 213 can be a connector (wired or wireless) of the same type as a connector (e.g., connector 111 as described with respect to FIG. 1) to permit the connector to couple to the corresponding connector. For example, the corresponding connector 213 can be a USB connector, among other types of wired and/or wireless connectors.

The SERDES 222 and the second SERDES 226 can be the analogous to the SERDES of the host computing device. The SERDES 222 and/or the second SERDES 226 can perform serialization and/or deserialization of instructions and/or data to provide data transmission over a limited input/output interface.

For example, the SERDES 222 can including SIPO (Serial Input, Parallel Output) hardware to deserialize a serialized communication including the PCIe data that is received from the host computing device. The deserialized communication and data included therein such as PCIe data received from the host computing device can be provided to the peripheral controller 224, among other possibilities.

As mentioned and in contrast to other approaches, it is noted that the PCIe is not provided to the second SERDES 226, nor is the PCIe data provide outside of the peripheral controller 224 (once received by the peripheral controller). Thus, the peripheral controller 224 can transmit (or cause the transmission of) data such as USB data, display port data, among other types of data to other portions of the peripheral device and/or outside the peripheral device but the peripheral controller 222 does not transmit (or cause the transmission of) PCIe data to other portions of the peripheral device or outside of the peripheral device. Again, it is noted the peripheral device can operate in full duplex mode with the host computing device and can therefore transmit and/or receive PCLe data with the host computing device.

The peripheral controller 224 refers to a hardware logic device (e.g., a logic die, ASIC that can execute instructions to perform various aspects of safe peripheral device communications. The peripheral controller 224 110 can include hardware components and/or computer-readable and executable instructions to receive, via the SERDES 222, PCIe data from a host computing device, among other possibilities.

Figure 3:
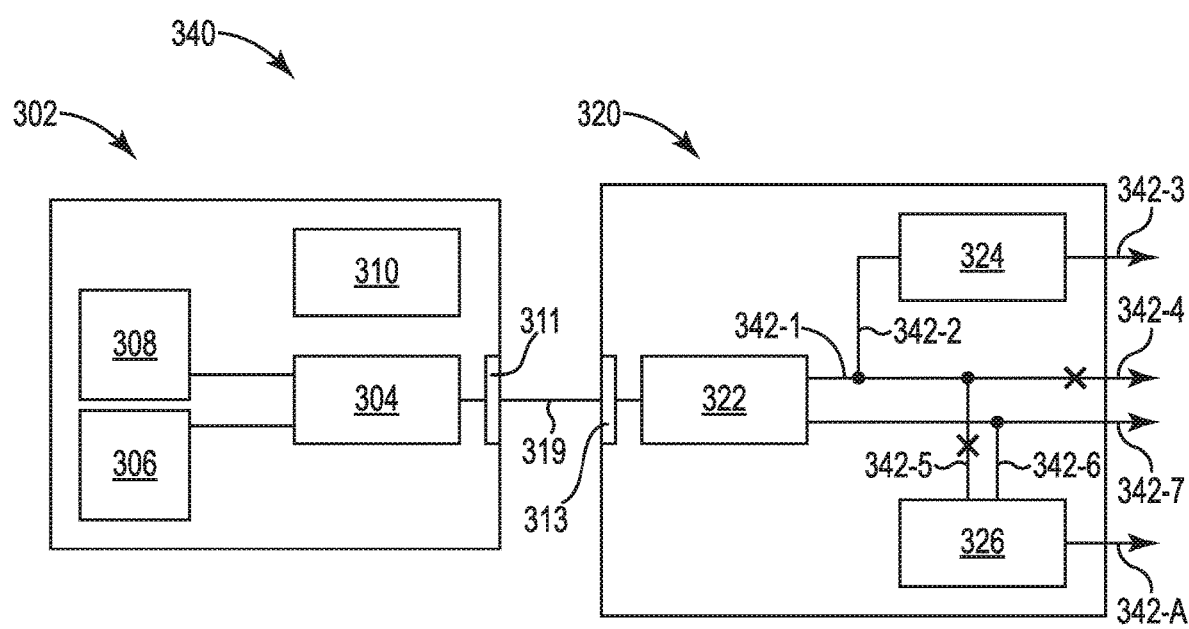
FIG. 3 illustrates a diagram of an example of a system for safe peripheral device communications according to the disclosure.

FIG. 3 illustrates a diagram of an example of a system for safe peripheral device communications according to the disclosure. As illustrated in FIG. 3, the system 340 can include a host computing device 302 and a peripheral device 320.

Hosting computing device 302 is analogous to host computing device 102 as described herein with respect to FIG. 1. For instance, host computing device 302 can include a SERDES 304, a PCIe bus 306, a video source 308, a host processor 310, and a connector 311 that are analogous to the SERDES 104; the PCIe bus 106, the video source 108, the host processor 110, and the connector 111, respectively, as described with respect to FIG. 1.

Similarly, peripheral device 320 is analogous to peripheral device 120 described herein with respect to FIG. 1. For instance, peripheral device 320 can include a corresponding connector 313, a SERDES 322; a second SERDES 326, and a peripheral controller 324 that are analogous to the corresponding connector 213; the SERDES 222, the second SERDES 226, and the peripheral controller 224 as described herein with respect to FIG. 2.

It is again noted the PCIe can be provide from the host device 302 to the peripheral device 320 via communication path 319 formed when the connector 311 of the host device 302 is coupled to the corresponding connector 313 of the peripheral device 320. For example, the host computing device 302 can be 'docked' in the peripheral device 320, among other possible coupling mechanisms.

The peripheral device 320 includes communications paths 341-1, 342-2, 342-3, 342-4, 342-5; 342-6, 342-7, . . . ; 342-A between portions of the peripheral device 320 and/or between the peripheral device and other peripheral devices. For example, communications paths 342-1, 342-2, 342-5, 342-6 represent internal communication paths between components within the peripheral device while communication paths 342-3, 342-4; 342-7, 342-A. The peripheral device 320 can include more or less communication paths.

As mentioned, while the FIG. 3 illustrates the corresponding connector 313, the SERDES 322; the peripheral controller 324, and the second SERDES 326 as separate and distinct components it is understood that such components and/or other components may be combined. For instance, each of the SERDES 322 and the second SERDES 326 can be included within (within a physical footprint of) the peripheral controller 324 to promote aspects of safe peripheral communications such as providing the PCIe data solely to the peripheral controller 224. Thus, any of communication paths 341-1, 342-2, 342-3, 342-4, 342-5, 342-6, 342-7, . . . , 342-A, which are illustrated as separate and distinct may be combined.

In any case, while the peripheral controller 324 can receive PCIe (e.g., via communication path 319, 342-1, and 342-2) it is again noted the peripheral controller does not transmit the PCIe other otherwise permit the PCIe data to be provided to communication paths 342-3, . . . 342-A. Thus, the peripheral controller 324 can include instructions and/or receive instructions (e.g., from the host controller 310) such that the peripheral controller does not transmit the PCIe other otherwise permit the PCIe data to be provided to communication paths 342-3, . . . 342-A. In this manner, PCIe data is solely provided from the host device 302 to the peripheral controller 324.

However, the peripheral device 320 (and other peripheral devices coupled to the peripheral device) can desirably maintain various functions such as display functions even when coupled to a host computing device operating in safe mode. That is, the peripheral can transmit or otherwise communicate non-PCIe data such as USB data and/or DP data with various other portions of the peripheral device 320 and/or with other peripheral devices, for instance, via a communication path of the communication paths 342-3, . . . 342-A.

Figure 4:
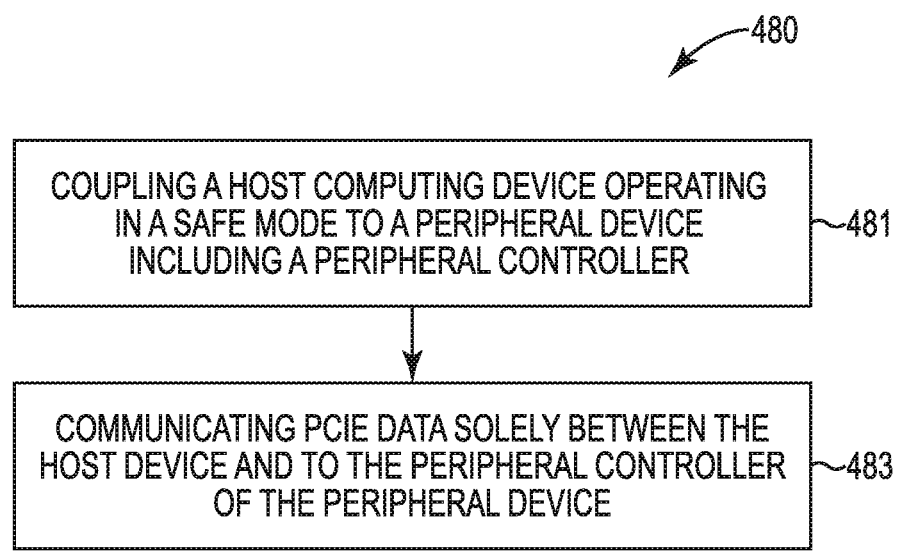
FIG. 4 illustrates a flow diagram of an example of a method of safe peripheral device communications according to the disclosure.

FIG. 4 illustrates a flow diagram of an example of a method of safe peripheral device communications according to the disclosure. As illustrated at 481, the method 480 can include coupling a host computing device operating in a safe mode to a peripheral device including a peripheral controller. Coupling refers to a removable coupling, in various examples. For instance, in some examples, a host computing device can be removably 'docked' in a peripheral device, among other types of coupling. Coupling the host computing device with the peripheral device (in a wired or wireless manner) can permit communication of data such as PCIe and/or wireless PCIe between the host computing device and the peripheral device.

That is, as illustrated at 483, the method 480 can include providing PCIe data solely between the host device and to the peripheral controller of the peripheral device, as described in greater detail with respect to FIGS. 1-3. For example, the method 480 can include the host device providing PCIe data to the peripheral controller of the peripheral device. However, while the disclosure provides PCIe data solely to a peripheral controller of a peripheral device it is understood that any number of peripheral devices can be utilized with safe peripheral device communication.

For instance, in some examples, the peripheral device is included in a plurality of peripheral devices. In such examples, the method can include providing PCIe data solely between the host device and respective peripheral controllers of each peripheral device of the peripheral devices using the same of similar techniques described with respect to the peripheral device as described in FIGS. 1-3.

In some examples, the method can include outputting the video data such as DP data and/or USB data from the peripheral controller to another peripheral device. In this manner, peripheral devices can be connected in parallel or in series (daisy chained) to the peripheral devices and each of the peripheral device of the peripheral devices coupled to the peripheral device (e.g., 320 as illustrated in FIG. 3) can have respective functionalities such as a display functionality.

For example, the peripheral can be a docking station can be coupled to a display having a display functionality whereby the peripheral device provides video data such as DP data to the display. For instance, the peripheral device when coupled to a host computing device operating in safe mode can provide 4K display capabilities when coupled to another peripheral device.

As mentioned, the host device can operation in a safe mode to provide PCIe solely to a peripheral controller of a peripheral device. The safe mode can be a default mode of operation of the host computing device and/or can be a selectable option. For instance, in some examples, the method can include selecting a safe mode on a host computing device prior to providing the PCIe data solely to the peripheral controller. Thus, a user and/or the host computing device in response to a system condition can select the safe mode. For example, an end user can selectively enter the safe mode by selecting the same via a graphical user interface of the host computing device and/or by another selection mechanism. Similarly, it is understood that the method can include deselecting the safe mode.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that there are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples (e.g., having different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 110 may refer to element 110 in FIG. 1 and an analogous element may be identified by reference numeral 310 in FIG. 3. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a number of" an element and/or feature can refer to one or more of such elements and/or features.

What is claimed:

1. A host computing device, comprising:
   a memory;
   a serializer/deserializer (SERDES): including Parallel In Serial Out (PISO) hardware to serialize data and Serial Input and Parallel Output (SIPO) hardware to deserialize data;
   a peripheral component interconnect express (PCIe) bus;
   a video source;
   a wired connector coupled, via the SERDES, to the PCIe bus and the video source; and
   a host controller to operate in a safe mode to block a direct memory attack on the memory in response to the wired connector of the host computing device being coupled to a corresponding wired connector in a docking station by causing PCIe data from PCIe bus to be provided, via the SERDES and the wired connector to the corresponding wired connector in the docking station and an additional SERDES in the docking station such that the PCIe data is provided solely to a peripheral controller of the docking station, wherein the host computing device further comprises a laptop computing device, a mobile phone, a tablet, or a desktop computing device.

2. The host computing device of claim 1, wherein the PISO hardware is to serialize video data from the video source and the PCIe data into a serialized data communication provided solely to the peripheral controller of the docking station.

3. The host computing device of claim 2, wherein the video data further comprise display port video data from a display port interface included in the host computing device.

4. The host computing device of claim 1, wherein the wired connector further comprises a universal serial bus connector.

5. A docking station, comprising:
   a SERDES including:
     Parallel In Serial Out (PISO) hardware to serialize data; and
     Serial Input, Parallel Output (SIPO) hardware to deserialize data;
   a corresponding wired connector; and
   a peripheral controller, when coupled to a wired connector and a SERDES of a host computing device operating in a safe mode in response to the wired connector of the host computing device being coupled to the corresponding wired connector in the docking station, is to block a direct memory attack on a memory of the host computing device, the peripheral controller is to:
   communicate, via the SERDES of the docking station and the corresponding connector of the docking station, peripheral component interconnect express (PCIe) data solely with the SERDES and the wired connector of the host computing device; and
   transmit non-PCIe data outside of the peripheral controller, wherein the host computing device further comprises a laptop computing device, a mobile phone, a tablet, or a desktop computing device.

6. The docking station of claim 5, including an output to output a video data from the peripheral controller, but not PCIe data, to another peripheral device.

7. The docking station of claim 5, wherein the SIPO hardware is to deserialize a serialized communication including PCIe data received from the wired connector and the SERDES of the host computing device.

8. A method, comprising:
coupling a SERDES and a wired connector of a host computing device a corresponding connector and a SERDES of a docking station including a peripheral controller, wherein the host computing device further comprises a laptop computing device, a mobile phone, a tablet, or a desktop computing device;
responsive to the wired connector of the host computing device being coupled to the corresponding wired connector causing the host computing device to operate in safe mode; and
while the host device is operating in the safe mode, providing PCIe data solely between the wired connector and the SERDES in the host device and the corresponding connector, the SERDES, and the peripheral controller of the peripheral device, wherein the SERDES in the host device and the SERDES in the peripheral controller each include:
Parallel In Serial Out (PISO) hardware to serialize data; and
Serial Input, Parallel Output (SIPO) hardware to deserialize a serialized communication.

9. The method of claim 8, wherein the docking station is included in a plurality of peripheral devices, and the method further comprising providing PCIe data solely between the host device and respective peripheral controllers of each peripheral device of the peripheral devices.

10. The method of claim 9, further comprising outputting video data from the peripheral controller to another peripheral device.

11. The method of claim 8, further comprising selecting a safe mode on a host computing device prior to providing the PCIe data solely to the peripheral controller.

* * * * *